United States Patent [19]

Blaimschein et al.

[11] 4,257,724
[45] Mar. 24, 1981

[54] MILLING TOOL FOR MACHINING CYLINDRICAL SECTIONS

[75] Inventors: Gottfried Blaimschein; Otto Marzy, both of Steyr, Austria

[73] Assignee: GFM Gesellschaft fuer Fertigungstechnik und Maschinenbau Aktiengesellschaft, Steyr, Austria

[21] Appl. No.: 27,857

[22] Filed: Apr. 6, 1979

[30] Foreign Application Priority Data

Apr. 18, 1978 [AT] Austria ................................ 2713/78

[51] Int. Cl.³ ............................. B23C 3/06; B23C 5/26
[52] U.S. Cl. .................................... 409/232; 409/199; 409/234; 407/31
[58] Field of Search ..................... 407/31; 408/203.5; 409/234, 232, 231, 199, 200

[56] References Cited

U.S. PATENT DOCUMENTS

| 433,458 | 8/1890 | Eberhardt et al. ............... 407/31 X |
| 3,899,814 | 8/1975 | Kralowetz . | |
| 4,110,055 | 8/1978 | Blaimschein et al. ............ 407/31 X |

FOREIGN PATENT DOCUMENTS 2551250  4/1978  Fed. Rep. of Germany .

Primary Examiner—Z. R. Bilinsky
Attorney, Agent, or Firm—Kurt Kelman

[57] ABSTRACT

A milling tool for machining cylindrical sections of crankshafts comprises a rotatable tool drum adapted to be mounted so that it surrounds the workpiece and to be driven and which at one end carries an internally cutting, annular primary cutter head and adjacent thereto is formed in its shell with apertures for the removal of chips. An internally cutting, annular supplemental cutter head has axially projecting claws and is detachably but rigidly secured to the primary cutter head and is axially supported against the latter by the claws. In such tool, a satisfactory removal of chips is ensured, and the supplemental cutter head can be simply and quickly removed to convert the multiple cutter tool to a single cutter tool.

3 Claims, 3 Drawing Figures

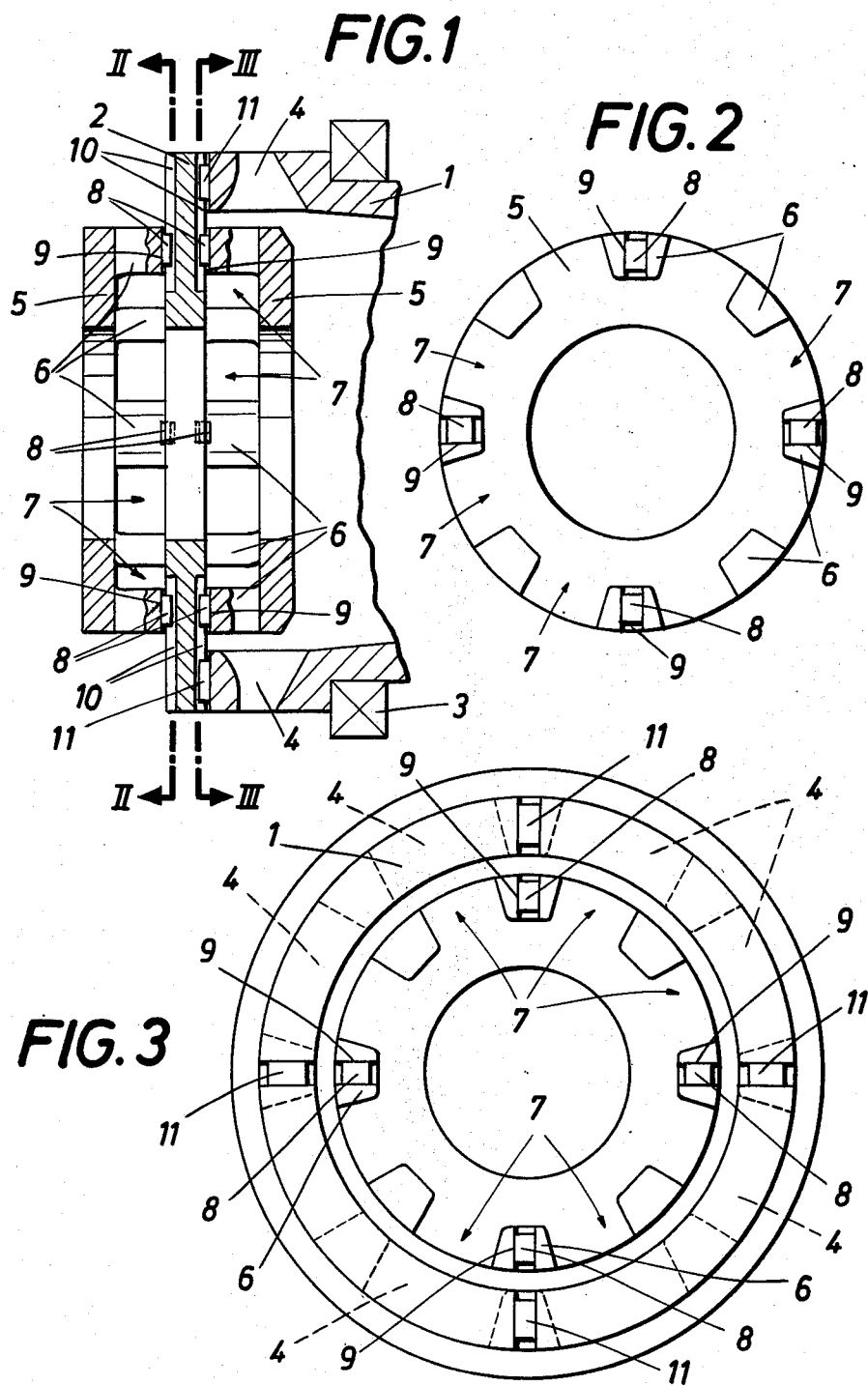

MILLING TOOL FOR MACHINING CYLINDRICAL SECTIONS

This invention relates to a milling tool for machining cylindrical sections, of a workpiece particularly cylindrical portions of crankshafts, comprising a rotatable tool drum adapted to be mounted so that its surrounds a workpiece and to be driven and which at one end carries an internally cutting, annular cutter heat.The drum shell is formed adjacent this end with apertures for the removal of chips.

In tools having an internally cutting cutter head, it is essential that said cutter head can be secured as rigidly as possible to the tool drum and that a substantial thermal expansion of that tool drum is prevented. For instance, it has been found satisfactory so to arrange the annular cutter head that it has a large surface in direct contact with the end of the tool drum and to provide the tool drum in its shell with apertures which permit of a fast removal of the chips falling into the drum and which inhibit an excessive flow of heat within the shell of the drum from the cutter head to the bearings for the drum. On the other hand, the previously known tools of that kind have the disadvantage that each tool drum can be provided only with a single cutter head so that two complete tools, each consisting of a tool drum and a cutter head, are required for machining two sections at the same time.

German Patent Specification No. 25 51250 discloses a crankshaft-milling machine comprising a hollow spindle for accommodating a plurality of circular ring-shaped milling cutters, which are provided with inserted cutting teeth on their inside peripheral surface, and a tool-holding bushing, which is attached to the hollow spindle and in its bore has a plurality of sockets for receiving milling cutters serving to machine a plurality of crankpins at the same time, whereas annular series of apertures for a removal of chips are provided between said sockets. That tool is inherently designed for milling a plurality of sections at the same time and cannot be used to mill only a single section unless the tool has been substantially altered. In practice it is not inherently known whether a given workpiece permits of being machined at a plurality of sections at the same time. This can be found in most cases only by trial milling. For this reason that known crankshaft-milling machine can be used only in a specific, highly restricted field. Also, the mounting of the milling cutters is not sufficiently rigid for a high-quality milling operation. This is due to the fact that each milling cutter is mounted in the bore of the receiving bushing, where the conditions do not permit an adequate fixation, and that all milling cutters must be attached to the hollow spindle by means of the tool-holding bushing. The area of contact between the milling cutters and the tool-holding bushing is very small, and there is not only a joint between each milling cutter and the bushing but also a joint between the bushing and the hollow spindle. As the hollow spindle has a closed shell, the chips falling into the spindle cannot quickly be removed from the spindle and there is an unrestricted flow of heat in the hollow spindle. Whereas the apertures provided in the tool-holding bushing between the milling cutters ensure that the chips will not remain in the tool-holding bushing, these apertures cannot be used to remove chips from the hollow spindle. It is an object of the invention to provide a tool which is of the kind described first hereinbefore and which can be altered in a simple and fast manner from a single cutter tool to a multiple cutter tool and even as a multiple tool ensures a rigid mounting of its inserted-tooth cutters and also enables a consistently good removal of chips.

This object is accomplished according to the invention with a primary cutter head secured to the tool drum and an internally cutting, annular supplemental cutter head which has axially projecting claws and is detachably secured direct to said primary cutter head and is supported thereon by said claws against axial movement. Owing to that arrangement, the supplemental cutter head can simply be detached from the primary cutter head to convert a multiple cutter tool to a single cutter tool, and a single cutter tool can simply be converted to a multiple cutter tool. For the latter alteration it is not necessary to remove the single cutter head and to replace it by a multiple cutter head consisting of a plurality of components but one or more supplemental cutter heads can be attached direct to the primary cutter as is necessary or desired. The firm connection between the primary cutter head and the tool drum is preserved and the connection between the primary cutter head and the supplemental cutter head ensures a high rigidity owing to the supporting claws. Any unnecessary joint between the tool drum and the primary cutter head and the supplemental cutter head is avoided. Because the removal of chips from the tool drum will not be hindered by the supplemental cutter head and a radial removal of chips between the primary cutter head and the supplemental cutter head is even promoted by the presence of relatively large spaces between adjacent claws, a rapid removal of chips will always be ensured.

According to a preferred feature of the invention, spaces registering with and conforming to the apertures in the shell of the tool drum are defined between adjacent claws of the supplemental cutter, the primary cutter at an end face thereof, the primary inserted-tooth cutter head has an axially inner end face facing the tool drum and the supplemental cutter head is secured to said inner end face. That arrangement is compact and involves only a small overhang and a favorable bearing for the tool drum so that two sections can be milled at the same time with high accuracy. To ensure that this arrangement will not interfere with the removal of chips, the spaces between the claws of the supplemental cutter head conform to the apertures in the shell so that chips falling through between the claws will be removed immediately through the apertures in the shell.

The assembling of a triple cutter tool will be obtained if two supplemental cutters are secured to respective opposite end faces of the primary cutter head. In such an arrangement, each supplemental cutter head may be independently connected to the primary cutter head, or both supplemental cutters may be secured to the primary cutter head by common screws extending through all cutters.

To ensure a centering which will meet all requirements, the supplemental cutter head is provided with radial grooves in the end faces of claws which are spaced equal angles apart, preferably at the end faces of four claws spaced 90° apart, and centering keys are fitted in said radial grooves and in registering radial grooves of the primary cutter head.

In an embodiment of the invention, said radial grooves in said primary cutter head are formed in an end face thereof which faces said drum, and radial keys for centering said primary cutter head with respect to said drum are fitted in said radial grooves in said primary cutter head and engage said drum.

An embodiment of the invention is shown diagrammatically and by way of example on the accompanying drawings, in which FIG. 1 is an axial sectional view showing a tool according to the invention and FIGS. 2 and 3 are transverse sectional views taken on lines II—II and III—III, respectively, in FIG. 1.

Rotatable tool drum 1 is adapted to be driven and carries an internally cutting, annular primary cutter head 2. Between said inserted-tooth cutter head 2 and drum bearing 3 adjacent thereto, the shell of the drum is formed with apertures 4 for centrifugal removal of chips. This single cutter tool can be converted in a simple manner to a compact, rigid multiple cutter tool. To that end, the primary inserted-tooth cutter head 2 has associated with it two internally cutting, annular supplemental cutter heads 5 which have axially projecting claws 6 adapted to be connected to the primary cutter head 2 by screws extending through the claws 6 so that claws 6 bear on the adjacent end face of the primary cutter head 2. In the embodiment shown by way of example, two supplemental cutter heads 5 are attached to respective end faces of the cutter head 2 so that a triple cutter tool has been provided, with which three sections of a workpiece can be machined at the same time. Obviously, only one of the supplemental cutter heads may be connected by screws to the cutter head 2 in order to convert the original single cutter tool to a double cutter tool. To ensure a satisfactory removal of chips, the spaces 7 between adjacent claws 6 register with and conform to the apertures 4 in the drum shell so that, even when a supplemental cutter head 5 is disposed inside the drum the chips can be removed via radial through paths. Four centering keys 8 are provided for centering each supplemental cutter head 5. Said keys are received in radial grooves 9 formed in the end faces of four claws 6 of the supplemental cutter head 5, which claws are spaced 90° apart, and in registering radial grooves 10 formed in the cutter head 2. The cutter head is similarly centered with respect to the tool drum 1 by means of four centering keys 11, which are received in the radial grooves 10 in that end face of the cutter head 2 which faces the drum. These radial grooves 10 receive the keys 8 for centering the supplemental cutter head 5 disposed inside the drum as well as the keys 11 for centering the primary cutter head 2 and the tool drum.

What is claimed is:

1. A milling tool for machining cylindrical sections of a workpiece, comprising
   (a) a rotatable tool drum adapted to be mounted so that it surrounds the workpiece to be machined and to be driven, the drum having a shell formed near one end with apertures for removal of chips,
   (b) an internally cutting, annular primary cutter head peripherally secured to the shell at the one end, the primary cutter head having a first, inwardly directed end face and a second, outwardly directed end face, and
   (c) an internally cutting, annular supplemental cutter head including axially projecting claws detachably secured to one of the end faces of the primary cutter head, the claws supporting the supplemental cutter head on the primary cutter head against axial movement in relation thereto.

2. The milling tool of claim 1, wherein the one end face is the inwardly directed end face and the claws define spaces therebetween, the spaces registering with, and conforming to, the apertures in the shell.

3. The milling tool of claim 1 or 2, comprising a respective ones of the supplemental cutter heads detachably secured to each one of the end faces.

* * * * *